(12) United States Patent
Ördögh

(10) Patent No.: US 10,313,286 B2
(45) Date of Patent: Jun. 4, 2019

(54) QUALIFIED EMAIL HEADERS

(71) Applicant: BlackBerry Limited, Waterloo (CA)

(72) Inventor: Zoltán Ördögh, Mississauga (CA)

(73) Assignee: BlackBerry Limited, Waterloo, Ontario (CA)

(*) Notice: Subject to any disclaimer, the term of this patent is extended or adjusted under 35 U.S.C. 154(b) by 141 days.

(21) Appl. No.: 13/940,007

(22) Filed: Jul. 11, 2013

(65) Prior Publication Data

US 2015/0019652 A1    Jan. 15, 2015

(51) Int. Cl.
*H04L 29/06* (2006.01)
*H04L 12/58* (2006.01)

(52) U.S. Cl.
CPC .......... *H04L 51/14* (2013.01); *H04L 51/16* (2013.01); *H04L 51/34* (2013.01); *H04L 63/20* (2013.01); *H04L 69/04* (2013.01); *H04L 69/22* (2013.01)

(58) Field of Classification Search
CPC ... H04L 63/0428; H04L 63/20; H04L 63/308; H04L 12/589; H04L 51/36
See application file for complete search history.

(56) References Cited

U.S. PATENT DOCUMENTS

| | | | |
|---|---|---|---|
| 2004/0064515 A1* | 4/2004 | Hockey | G06F 21/562 709/206 |
| 2004/0170121 A1* | 9/2004 | Kim | H04B 1/69 370/208 |
| 2005/0160292 A1* | 7/2005 | Batthish | H04L 12/58 726/5 |
| 2005/0207408 A1* | 9/2005 | Elliott | H04L 69/04 370/389 |
| 2006/0031315 A1* | 2/2006 | Fenton | H04L 51/12 709/206 |

(Continued)

OTHER PUBLICATIONS

European Extended Search Report; Application No. 14176702.0; dated Nov. 14, 2014; 7 pages.
Levine, J.R., et al.; "Mail Header Trace Fields"; draft-levine-trace-header-registry-01; Network Working Group Internet-Draft; Jan. 2012; 6 pages.

(Continued)

*Primary Examiner* — Barbara B Anyan
(74) *Attorney, Agent, or Firm* — Conley Rose, P.C.; J. Robert Brown, Jr.; Joseph J. Funston, III

(57) ABSTRACT

A method and system provide qualifiers for electronic message header fields. The electronic messages may be email, text, or other messages sent via a wireless or wired communications networks. The qualifiers may facilitate (1) indicating the persistent nature of an electronic message header field; (2) electronic message originator identification; (3) user-defined rules being persistently applied to electronic messages by various entities as the electronic messages travel along; (4) user opt out of electronic message strings or groups; (5) the closing electronic message threads; (6) the ordering of electronic message header fields; (7) electronic message tracing; and/or (8) electronic message tracking. In one aspect, the qualifiers may be of a persistent or indexed nature. The qualifiers and associated qualified electronic message header fields may be generated, operated on, relayed, and/or handled by mobile devices, networks, servers, and/or communications systems to facilitate electronic message-related functionality being achieved either locally or remotely.

16 Claims, 10 Drawing Sheets

(56) References Cited

U.S. PATENT DOCUMENTS

| | | | | |
|---|---|---|---|---|
| 2006/0200530 A1* | 9/2006 | Tokuda | ............... | H04L 51/14 709/206 |
| 2007/0002900 A1* | 1/2007 | Karkas | ............... | H04L 1/0041 370/473 |
| 2007/0116118 A1* | 5/2007 | Kostrzewski | ......... | H04L 1/0009 375/240.12 |
| 2008/0148370 A1* | 6/2008 | Allwright | ............ | G06F 21/608 726/5 |
| 2008/0192774 A1* | 8/2008 | Singh | ............... | H04L 1/1867 370/473 |
| 2010/0223342 A1* | 9/2010 | Brown | ............... | H04L 63/20 709/206 |
| 2011/0032952 A1* | 2/2011 | Rochon | ............... | H04L 69/04 370/477 |
| 2012/0047014 A1* | 2/2012 | Smadja | ............... | G06Q 30/02 705/14.53 |
| 2012/0150969 A1 | 6/2012 | Reed et al. | | |
| 2013/0117383 A1* | 5/2013 | Hymel | ............... | G06Q 10/107 709/206 |

OTHER PUBLICATIONS

Crocker, D.; "Internet Mail Architecture"; RFC 5598; Jul. 2009; 54 pages.

Crocker, David H.; "Standard for the Format of ARPA Internet Text Messages"; RFC 822; Aug. 13, 1982; 50 pages.

Resnick, P.; "Internet Message Format"; RFC 2822; Apr. 2001; 51 pages.

Resnick, P.; "Internet Message Format"; RFC 5322; Oct. 2008; 57 pages.

Crocker, D., et al.; "Augmented BNF for Syntax Specifications: ABNF"; RFC 5234; Jan. 2008; 16 pages.

Leach, P., et al.; "A Universally Unique IDentifier (UUID) URN Namespace"; RFC 4122; Jul. 2005; 30 pages.

Klensin, J.; "Simple Mail Transfer Protocol"; RFC 5321; Oct. 2008; 95 pages.

Moore, K., et al.; "An Extensible Message Format for Delivery Status Notifications"; RFC 3464; Jan. 2003; 38 pages.

European Examination Report; Application No. 14176702.0; dated Mar. 23, 2018; 4 pages.

* cited by examiner

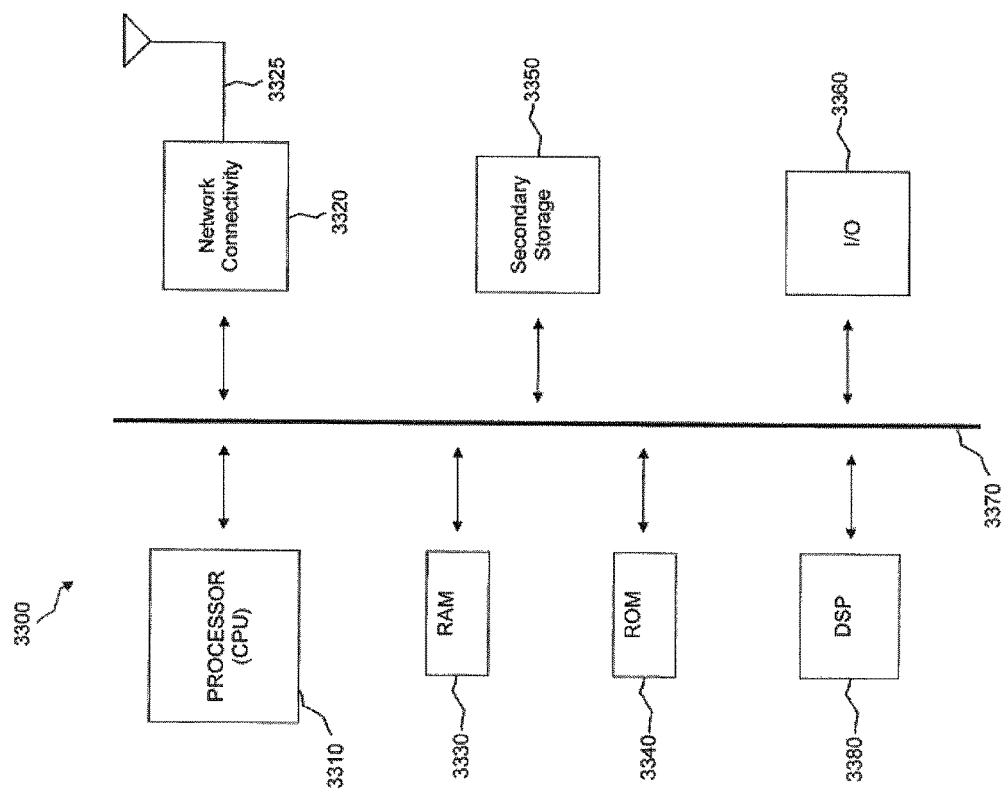

QUALIFIED EMAIL HEADERS

FIELD OF THE DISCLOSURE

In general, the present disclosure relates to email, texting, or other electronic messaging. More specifically, the present disclosure relates to enabling additional email, texting, or electronic message-related functionality.

BACKGROUND

As used herein, the term "user equipment" (alternatively "UE") might in some cases refer to mobile devices or wireless devices such as mobile telephones, personal digital assistants, handheld, laptop computers or personal computers, and similar devices that have telecommunications capabilities, including text and email functionality. The terms UE, mobile device, and wireless device may be used interchangeably herein. Such a UE might include a device and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might include the device itself without such a module. In other cases, the term "UE" might refer to devices that have similar capabilities but that are not transportable, such as desktop computers, set-top boxes, or network appliances. The term "UE" can also refer to any component that can terminate a communication session for a user. Also, the terms "user equipment," "UE," "user agent," "UA," "user device," and "mobile device" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 10 is a diagram of an exemplary processing component.

Figure 1:
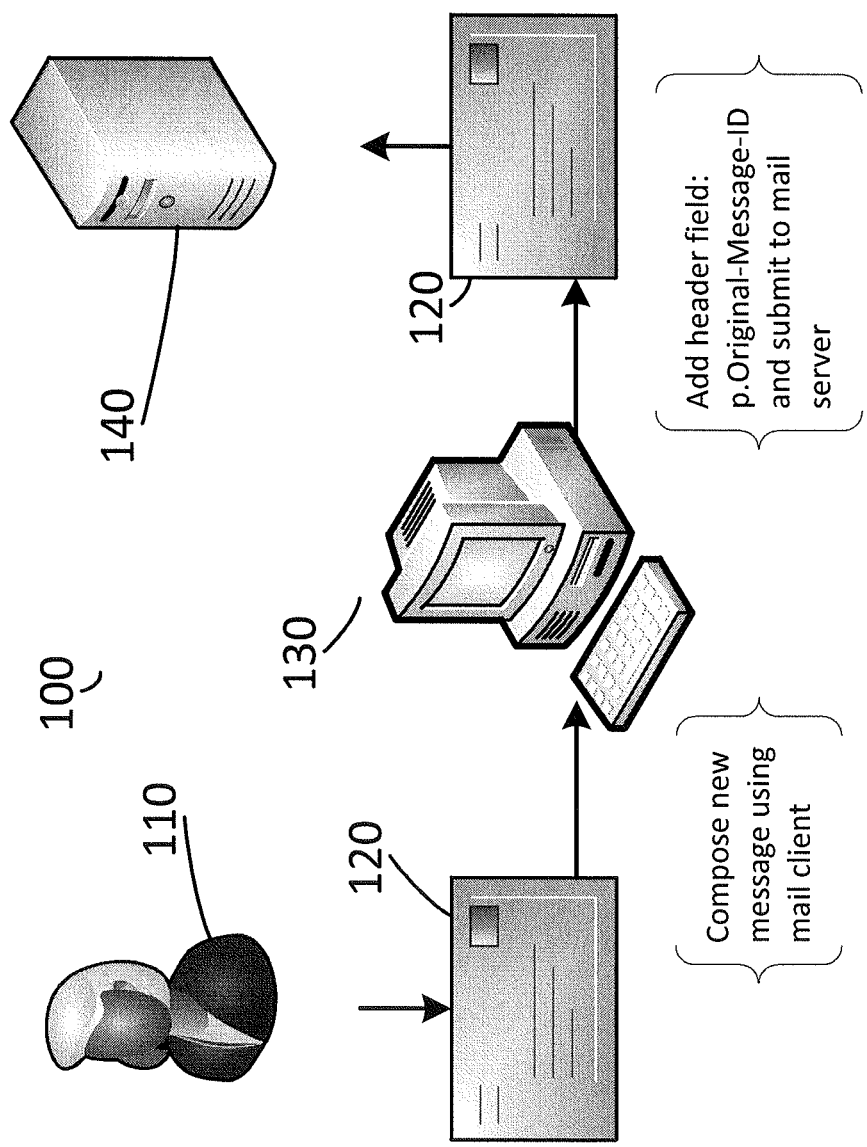
FIG. 1 is a diagram of sending a new message with an exemplary persistent header field.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

DETAILED DESCRIPTION

The present embodiments may provide methods and systems that use "qualifiers" and/or qualified electronic message header or header fields as a means of relaying information about email, text, internet, and/or other electronic messages among various entities. The qualifiers and/or associated qualified headers or header fields may facilitate various entities employing additional email-related, texting-related, internet messaging-related, and/or other electronic messaging-related functionality. An electronic message may include an email message, a text message, and/or other electronic messages carried over or conveyed via the internet or other wireless or wired communication system.

In one aspect, a "persistent qualifier" and/or persistently qualified header field may be used. The persistent qualifier and/or associated qualified header field may provide email, text, internet and/or other electronic messaging-related functionality that (1) indicates the persistent nature of an electronic message header field; (2) preserves specific electronic message header fields and/or information contained therein as an electronic message, such as a text or email, travels along or among various UE's, devices, servers, etc., such as to facilitate (a) electronic message originator identification and/or (b) user-defined rules to be persistently applied to the electronic message; (3) allows a server or other processing device to recognize that a user associated with an electronic message address, such as an email address, has already opted out of an electronic message string or group, and thus avoids delivery to that user of an electronic message associated with that electronic message string or group; (4) allows closure of electronic messaging threads; (5) facilitates electronic message tracing (see below); (6) facilitates electronic message tracking (see below); and/or (7) other electronic messaging-related functionality.

In another aspect, an "index qualifier" and/or indexed qualified header field may be used. The index qualifier and/or associated qualified header field may provide email, text, internet and/or other electronic messaging-related functionality that facilitates (1) the ordering of electronic message header fields; (2) electronic message tracing, such as allowing the originator or a server to find out where the electronic message has passed, from the very beginning; (3) electronic message tracking, such as allowing entities to generate reports detailing where electronic messages have been, who originated them, who has accessed or forwarded them, etc.; and/or (4) other electronic messaging-related (such as email-related or text messaging-related) functionality.

Below the qualifier concept, electronic message qualified header field functionality, persistent qualifiers, index qualifiers, exemplary use cases, and other exemplary embodiments are discussed in detail.

I. Qualifier Concept

Described herein are qualifiers for electronic message header fields. Examples of qualifiers include a qualifier that may indicate a persistent nature of an electronic message header or header field, and a qualifier that may facilitate the ordering of electronic message header fields. A qualifier may be used with one or more electronic message header or header fields, for example, an original thread header and a threading model header. The qualifiers may enable opting out of an electronic message thread; closing an electronic message thread; advanced tracing of electronic messages; and/or advanced tracking of electronic messages.

In one aspect, a qualifier for an electronic message header or header field may be viewed as a processing instruction, a means for conveying electronic message-related information to a processor, and/or means for enabling additional electronic message-related functionality as compared to conventional techniques. The qualifier may describe a permanent characteristic or convey information about an associated qualified electronic message header or header field and/or an electronic message associated with, or to which attaches, the qualified electronic message header or header field. In other words, a qualifier may be associated and/or linked with either or both (a) an electronic message header or header field, and (b) an accompanying or underlying electronic message. Thus, a qualifier may convey information among various entities about (a) the electronic message header or header field, and/or (b) the accompanying or underlying electronic message.

A qualifier may be used to indicate certain aspects of select electronic message headers or header fields. Qualifiers may prepend, append, wrap, amend, modify, characterize, classify, or otherwise alter the header or header field to which they apply. Qualifiers may be expressed using strings or tokens, which may be registered with a standards body or some other controlling body, for example the Internet Assigned Number Authority (IANA) or the Internet Engineering Task Force (IETF). All functional entities (e.g. mail user agent (MUA), message handling system (MHS), mail transfer agent (MTA), other electronic message originators and recipients, and/or other electronic message-related entities) may be configured to understand the qualifier concept—and if they do not support it, they may be able to ignore qualifiers. It should be noted that MUAs, MHSs and MTAs may be configured to always drop, or rewrite headers with unknown qualifiers. MHSs and MTAs may also configured to not drop headers with unknown qualifiers, while MUAs may be configured to drop only certain headers or header fields, such as header fields other than that those MUAs may be required to keep, such as "from," "to," "subject," or other header fields.

In some embodiments, a qualifier may indicate the persistence (or unalterable) nature of header fields, ensuring that certain email headers or header fields are preserved persistently and/or indefinitely. For example, with conventional email techniques, a user may be a member of a mailing list and receive an initial email that spawns dozens of forked threads, yet be unable to opt out—and therefore receive undesired messages, wasting resources, and annoying the end-user. A qualifier containing an identifier that was persistent from the very first electronic message may alleviate this issue, such as by allowing identification of all messages and forked threads that originate from the same discussion.

In other embodiments, a qualifier may be an index, indicating, for example, the order of identical header fields having different values or different header fields being part of the same group, enabling retaining historic information for the purposes of more advanced techniques such as tracking, tracing, loop detection, etc., depending on the type of the indexed header or header field(s). For instance, it may be desirable to know where the electronic message has been from the moment it has been created and sent, in a precise order. Such occasions may be associated with corporate audits, debugging, service pilots, interoperability tests, etc. Such tracking may not be possible without preserving information about the exact order of header fields.

Exemplary email header fields may be generally defined using the Augmented Backus-Naur Form (ABNF) syntax below:
  header-field=field-name ":" field-body CRLF
  field-name=1*VCHAR
  field-body=<see RFC5322>
The general syntax above may be modified, for example, to add qualifiers that prepend the header field name as follows:
  header-field=field-name ":" field-body CRLF
  field-name=*(qualifier ".") 1*VCHAR
  qualifier=(reg-qualifier/ext-qualifier)*1("=" value)
  reg-qualifier=<a qualifier token registered with IANA>
  ext-qualifier=<an extension qualifier token (i.e. any unregistered token)>
  value=1*VCHAR <except the dot character: '.'>
  field-body=<see RFC5322>
Other syntaxes and/or programming languages having additional, fewer, or alternate characteristics or functionality may be used.

In one embodiment, a processor may create or generate a qualifier and then add it to the header field to modify the header field into a qualified header field. For instance, the processor may generate qualifiers, such as qualifiers that facilitate header field preservation, originator identification; string or group opt out; thread closure; applying user-defined rules to electronic messages; message tracing; message tracking; and/or other electronic messaging-related functionality. The processor may automatically generate the qualifiers and/or qualified headers, such as in response to pre-defined conditions, e.g., the processor generating a new electronic message, receiving a new electronic message, transmitting an electronic message, reading or recognizing a qualifier associated with an electronic message, etc. Additionally or alternatively, the processor may generate the qualifiers and/or qualified headers in response to a user operation, such as a user operation entered via keyboard, touch screen, voice, gesture, hand or head movement, mouse, or other means.

The processor may associate or link a qualifier and/or qualified header field with a specific electronic message—all of which may be individually or collectively stored (permanently or temporarily) in a memory local to the processor. The processor may transmit or send the qualified header field containing the qualifier and the associated electronic message to another entity over a wired or wireless communications network.

Then, the entity that receives the electronic message over the wired or wireless communications network may have a processor configured to read, scan, or otherwise recognize the qualifier in the qualified header field. After which, the entity's processor may perform operations on or using the electronic message as identified by (or associated with) the qualifier to achieve the functionality discussed above and elsewhere herein, such as qualified header field (and contents thereof, including the qualifier) preservation, originator identification, opt out, thread closure, message tracing, message tracking, ordering or re-ordering of header fields, and/or other functionality disclosed herein.

A. Exemplary Persistent Qualifiers

An example of a qualifier is a persistence qualifier. The persistence qualifier may be used to indicate the persistent nature of an email, text, internet, or other electronic message header or header field, ensuring that a header or header field will be preserved throughout the entire lifetime of the header or header field, irrespective of what happens or what actions are applied to the electronic message containing the persistence qualifier (e.g., reply, forward, transmission through gateways and agents, etc.). In one aspect, the persistence qualifier may be static, unchangeable or unalterable by other entities, indestructible by other entities, and/or a constant qualifier characterizing or conveying information about a header or header field and/or associated electronic message.

In one embodiment, a qualifier token may indicate the persistence of the electronic message. For instance, an exemplary qualifier token allocated to indicate persistence may be 'p', a longer version 'pers', the full version 'persistent, or, any other token. The header fields marked as persistent may be preserved by all functional entities (e.g., MUA, MHS, and MTA). As an example, a header field may be:

X-Original-Thread-ID: MZ/X

Adding the persistence qualifier may cause the header field above to read as (depending, of course, on the final syntax and the choice of token for the persistence qualifier, in this example 'p'):

p.X-Original-Thread-ID: MZ/X

By using the persistence qualifier, any time an electronic message passes through a client (MUA), a server (MHS), a relay (MTA), or other electronic entity, any persistent header fields may be preserved without changes. In the above example, the X-Original-Thread-ID header field may be preserved at all times. The persistent nature of the X-Original-Thread-ID header field may allow a client and/or a server to find out that the incoming electronic message is related to a particular discussion from which the user has already opted out—and hence avoids electronic message delivery as a whole. Other persistence qualifiers and/or qualifier tokens having additional, fewer, or alternate characteristics and capabilities may be used.

B. Exemplary Index Qualifiers

Another example of a qualifier is an index qualifier. The index qualifier may indicate an order of the header fields associated with an email, text, internet, or other electronic message. The index qualifier may allow a functional entity to infer/reconstruct the precise order of header fields associated with the electronic message.

An exemplary qualifier token allocated to indicate an index may be T, a longer version 'idx', the full version Index' or, any other token. An index qualifier with a value of '0' (zero) may be omitted. Functional entities (e.g., MUA, MHS, and MTA) that add header fields that already exist in the message header may add the index qualifier to the header field with an increased value. As an example, a header field may be:

X-Peer-ID: 12345678ABCDEF

By adding the index qualifier, the header field above may read as (depending, of course, on the final syntax and the choice to indicate the value zero):

i.X-Peer-ID: 12345678ABCDEF
i=0.X-Peer-ID: 12345678ABCDEF

The next peer or functional entity (e.g., MUA, MHS, or MTA) may add its own X-Peer-ID and increase the index by one:

i=1.X-Peer-ID: 87654321FEDCBA

A third peer or functional entity (e.g., MUA, MHS, or MTA) may add its own X-Peer-ID and further increase the index by one:

i=2.X-Peer-ID: 1234ABC5678DEF

The index may be increased for each peer or functional entity (e.g., MUA, MHS, or MTA) that adds its own X-Peer-ID such that when the message is received and the headers are organized based upon the index, the headers may read:

i=0.X-Peer-ID: 12345678ABCDEF
i=1.X-Peer-ID: 87654321FEDCBA
i=2.X-Peer-ID: 1234ABC5678DEF In other words, a device that receives an electronic message with the index qualifier in the headers may rearrange the headers to place them in order according to the index number associated with each header. Thus, when the message passes through a client (MUA), a server (MHS), and/or a relay (MTA) that adds a header field that already exists, the index value may be increased. In the above example, the X-Peer-ID header field may be added with an incremental index by all peers or functional entities (e.g., MUA, MHS, MTA, or other electronic entities). The sequentially ordered nature of the X-Peer-ID header field may allow a client and/or server to clearly see where the message has passed through. Other index qualifiers and/or qualifier tokens having additional, fewer, or alternate characteristics or capabilities may be used.

II. Exemplary Header Fields

A. Exemplary Original-Thread-ID Header Field

Using current technology, in order to find out the origin of a thread (allowing faithful reproduction of a lengthy discussion thread on the user interface), mail agents need to sieve through headers of all available messages, collecting and analyzing various header fields. Typically, this involves the Message-ID, References and In-Reply-To header fields. Agents performing such analysis may consume considerable amounts of resources and still fail to determine the origin because earlier messages may have been already removed (or may not even have been received to begin with), thereby breaking the chain.

A persistent qualifier and/or persistent header field may allow specific header fields to be preserved throughout the entire lifetime of a thread associated with an electronic message. As an example, an Original-Thread-ID header may be used as a persistent header field to identify the originating thread and track it across multiple exchanges, irrespective of what happens to the individual messages at various electronic entities (e.g., reply, forward, transmission hop, etc.).

An exemplary value of the Original-Thread-ID may be a globally unique identifier rather than the Message-ID itself. Since universal unique identifiers (UUIDs) may guarantee uniqueness, UUIDs are used in examples herein; however, any other identifiers may be used as long as it may be generated on-the-fly while remaining globally unique. MUAs may add the Original-Thread-ID header field as a persistent header to all newly composed messages. Further, MUAs may preserve the Original-Thread-ID header field when a message is replied to or forwarded.

An example Original-Thread-ID header may be:
p.Original-Thread-ID: fb46e760-cb6c-11e1-9b23-0800200c9a66

Note the use of the exemplary persistence qualifier "p" to indicate that the header field is persistent. Other qualifiers and/or qualified header fields facilitating locating or identifying the originator of an electronic message that have additional, fewer, or alternate characteristics and/or functionality may be used.

B. Exemplary Threading-Model Header Field

In some embodiments, it may be desirable to express the intention of an electronic message creator/originator using a header field and preserve that header field along the lifetime of all related messages. The originator (such as a user of a computing device or other entity) may define some rules for the electronic message going forward, such as whether the message is going to be "public," "restricted," "unrestricted," "locked," or has to permanently abide by other user-defined or user-established rules, including those identified in Table I below.

For example, in some conventional messaging schemes, anyone may add/remove anyone else to a message thread, which may be counterproductive leading to leaking confidential information. On the other hand, in one embodiment of the present disclosure, a Threading-Model header may be used, which may be a persistent header field and it may only be added by the originator of the message. The value of the Threading-Model header field may be defined as a combination of various tokens, as bit fields, etc. This example uses tokens. Each token may represent a well-defined set of rules. Some token combinations may be forbidden either because they don't make sense, or, because the administrator enforces/forbids them. Some sample exemplary tokens are given in Table I below. In one embodiment, a token or combination of tokens may added to the persistent header field via user input operation or automatically via a processor, such as in response to certain pre-defined conditions/operations, e.g., email creation, reception, transmission, etc.

TABLE I

Sample Threading-Model Header Tokens

| Token | Description |
|---|---|
| Public | Anyone may reply and forward the message, add, remove recipients, and make any changes. This may be the default model to be used in case the originator did not specify it otherwise. |
| Internal | Anyone may add and remove recipients, but addresses beyond the current administrative domain may not be allowed. |
| Locked | Adding/removing recipients may not be allowed. |
| Unrestricted | Anyone may forward or reply. |
| Restricted | Anyone may reply but forwarding may not be allowed. |
| Notification | May not be replied to or forwarded. |
| Inclusive | All contents (body and attachments) may be retained on reply/forward. |
| Exclusive | All contents (body and attachments) may be removed on reply/forward. |

Addition of the Threading-Model header field may be restricted to the originating MUA only, or, the MTA serving the originator of the electronic message in case an administrative entity enforces a specific default value to be used (i.e., user did not specify it, the user-specified value is invalid or not permitted, the use of some mailing list requires a specific value, etc.). No matter who adds the header field to the message, the Threading-Model header field may be a persistent header field. All MUAs and/or other entities may preserve the Threading-Model header field when a message is replied to or forwarded. All MUAs and/or other entities may be required to adhere to the rules imposed by the Threading-Model header field as described in Table I.

A sample Threading-Model header is:
p.Threading-Model: internal restricted
Note the use of the exemplary persistence qualifier "p" to indicate that the header field is persistent. Also, note that the qualifier has been modified by two user-defined rules from Table I above, i.e., that the electronic message associated with this qualifier and Threading Model header field is classified or characterized by the user as both "internal" and "restricted," as those terms are used in Table I. Other qualifiers and/or qualified header fields facilitating user-defined rules related to electronic messages to be enforced by various entities that have additional, fewer, or alternate characteristics and/or functionality may be used.

III. Exemplary Use Cases
  A. Exemplary Opting Out from Thread
  Qualified headers may be used to allow a user to opt out from discussions (i.e., threaded messages). While only two examples are given below, a server-side (A) and a client-side (B) example, it should be understood that the use of qualified headers to opt out may be implemented in other manners as necessary.

In some embodiments, an administrator may define policies regarding opting out. Local laws, regulations, and/or internal policies may prevent users from one or more of: (a) opting out from all messages/threads sent to specific mailing lists; (b) opting out from individual threads to specific mailing lists; (c) opting out from threads not involving any mailing lists; (d) opting out from threads that were not originally sent to, but later on have been forwarded/copied to specific mailing lists; (e) opting out from threads include recipients beyond the administrative domain; (f) opting out from threads that did not originally include, but later on have been forwarded/copied to recipients beyond the administrative domain; (g) closing threads; (h) closing threads that include recipients beyond the administrative domain; (i) closing threads that did not originally include, but later on have been forwarded/copied to recipients beyond the administrative domain; etc.

The administrator may need to configure clients/servers according to their deployment models. The examples A and B presented herein assume that the administrator does not limit opting out in any way. Before describing examples A and B to opt out, an exemplary set of events are described, leading up to the point where a user makes a decision to opt out.

FIG. 1 is a diagram of sending a new message with an exemplary persistent header field 100. User 110 may compose a new email, text, internet, or other electronic message 120. Mail client (e.g. MUA) 130 may be configured to support persistent header field(s) for tracking threads—such as the Original-Thread-ID header field—and therefore generate and add a UUID to message 120 (e.g., p.Original-Thread-ID: fb46e760-cb6c-11e1-9b23-0800200c9a66). Mail client 130 then submits the message 120 to a mail server (e.g., MTA) 140 for delivery. In one embodiment, if the message 120 were a 'reply to' or a 'forward' of an existing electronic message, mail client 130 may include all persistent qualified header fields from the corresponding electronic message instead of generating and adding them.

Figure 2:
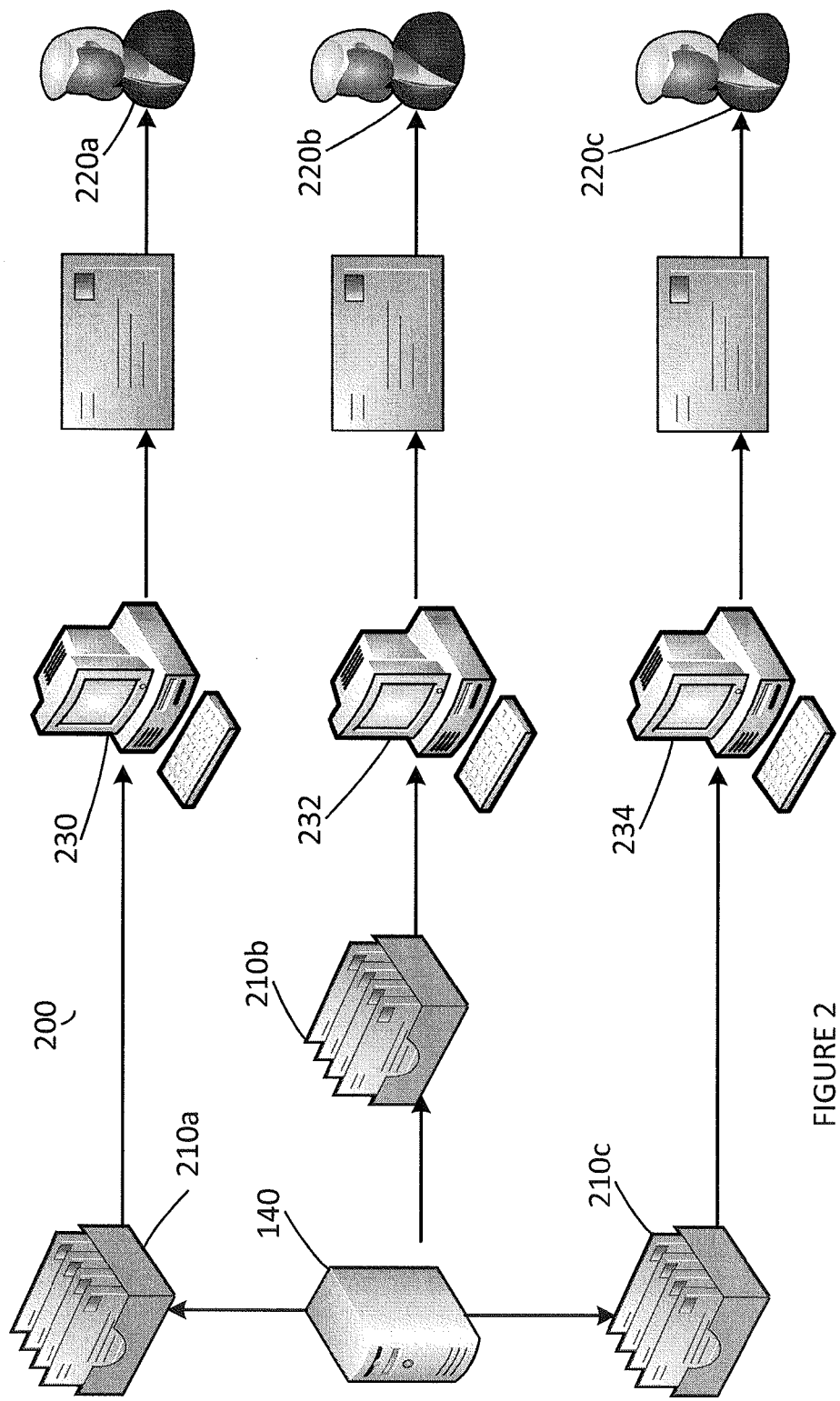
FIG. 2 is a diagram depicting exemplary message propagation.

FIG. 2 is a diagram of exemplary message propagation 200. Mail server 140 distributes copies of the electronic message 120 to mailboxes 210a, 210b, and 210c of users 220a, 220b, and 220c that the user 110 addressed the message 120 to. Users 220a, 220b, and 220c may view copies of the message 120 on their respective mail clients 230, 232, 234. While users 220a, 220b, and 220c are shown in FIG. 2, any number of users may receive a copy the message 120. Subsequently, users 220a, 220b, and 220c may begin replying to the message 120, and may add more recipients, thus expanding the distribution and possibly the scope of a message thread related to the message 120.

Figure 3:
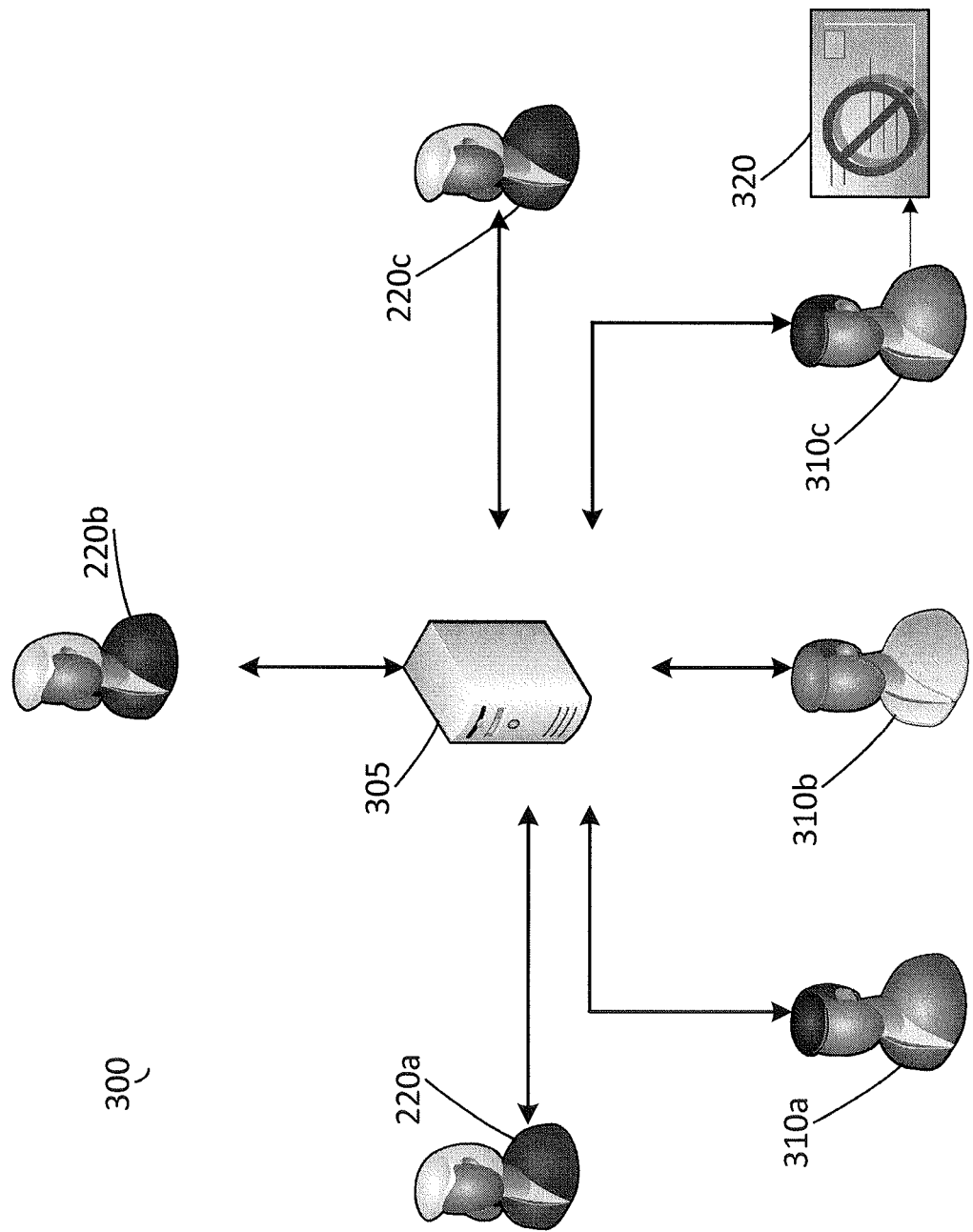
FIG. 3 is a diagram of an exemplary mesh message exchange with expansion of recipients/scope.

FIG. 3 is a diagram of an exemplary mesh message exchange with expansion of recipients/scope 300. As described above, the distribution and possibly the scope of a message thread may expand after the initial electronic message is sent. In this example, users 220a, 220b, and 220c may have included users 310a, 310b, and 310c on the message thread. While FIG. 3 depicts only three users 310a, 310b, and 310c, any number of users may be copied on the message thread on the first or subsequent exchanges in the same thread. Eventually, user 310c may wish to stop receiving any further electronic messages related to the thread, which means user 310c wishes to opt out. User 310c may provide an electronic or other indication 320 that he or she wishes to opt out, such as via a keyboard, mouse, touch screen, icon, and/or other user or user interface operation. The user-initiated indication 320 may be received and/or handled on the server-side (example A), on the client-side (example B), and/or, even a combination of the two.

1. Exemplary Server-Side Opt Out

In some embodiments, opt out may be handled on the server-side (i.e., by a mail server, etc.) utilizing the persistent qualifiers and/or associated qualified header fields of the present embodiments. Several alternatives may be chosen to allow users to opt out of a message thread. Examples may include (this list is not intended to be exhaustive): (a) a LISTSERV-like mechanism (i.e., the user who wants to opt out may send a specifically formatted email or other electronic message to a mailing list designed for the purpose of handling opt outs); (b) a user-specific rule may be created that contains all thread identifiers from which the user opted out; and/or (c) a database/file may be created that contains all thread identifiers for all and/or individual users. The user may use any of the above alternatives to opt out (or some other equivalent alternative for opting out).

The mail server may prevent the user from opting out as a whole, based upon administrative policies. On successful opt out, the server may record the thread-id of the thread that the user no longer wishes to receive messages from. Once opted out, the mail server serving the user may prevent messages related to the original thread from being deposited into the mailbox of the user who opted out, by verifying the appropriate header field and dropping the messages with matching identifiers. Alternatively, depending on policies, custom rules, or software implementation, the mail server may move messages to another mailbox (such as Deleted items', 'Spam' or 'Read later'), effectively organizing the messages rather than deleting them. The term "mail server" is further defined elsewhere herein. The present embodiments may also be used in conjunction with other mail servers having additional, less, or alternate capabilities.

Figure 4:
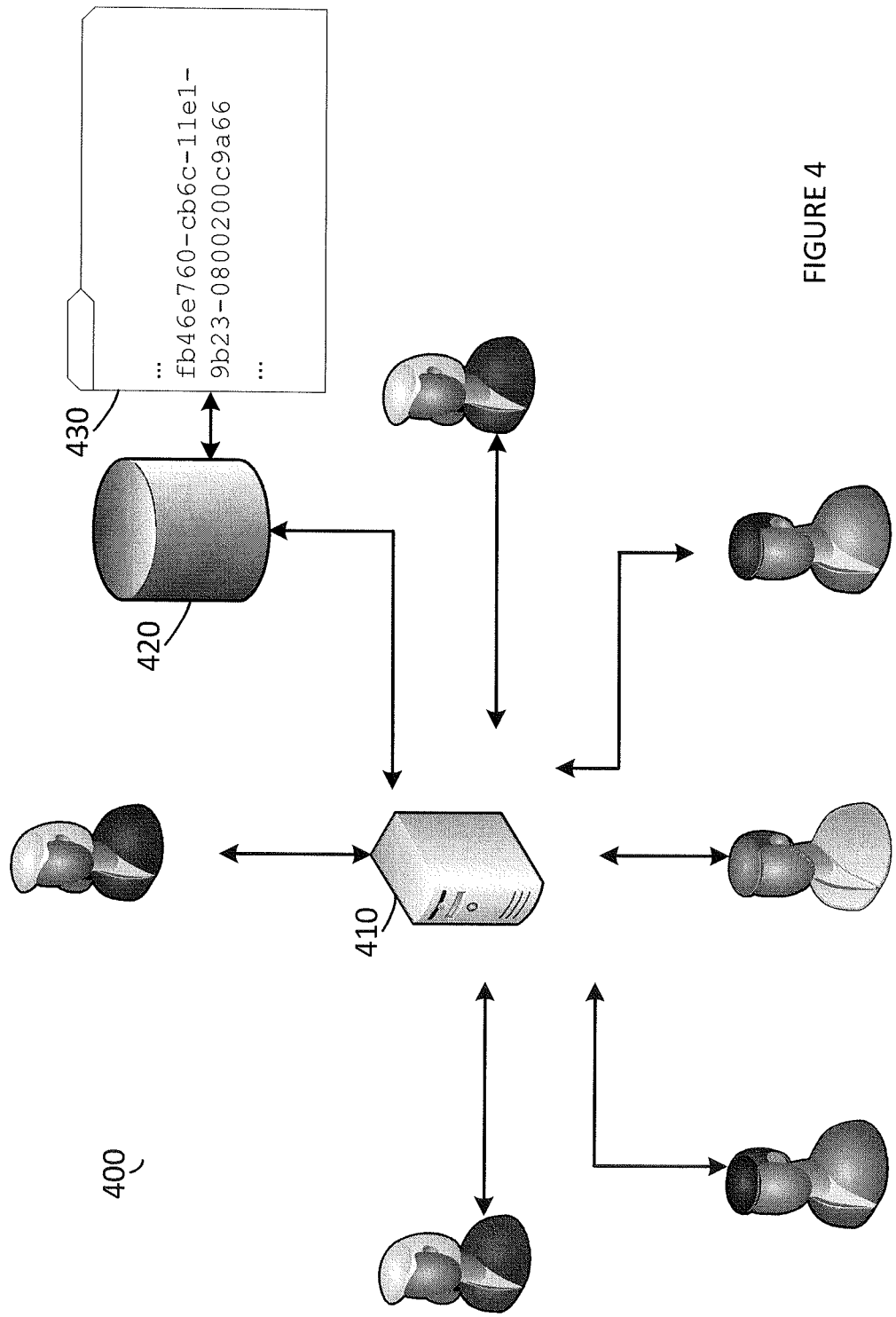
FIG. 4 is a diagram of an exemplary status check and message drop on the server side.

FIG. 4 is a diagram of an exemplary status check and message drop on the server side 400. In this embodiment, a mail server 410 may comprise a database 420 which may comprise a user's thread-id list 430, keeping a record of threads that each user has opted out from. While only one user's thread-id list 430 is depicted, any number of user's thread-id list 430 may be stored in database 420 based upon the number of users supported by mail server 410. In some embodiments, the database 420 may keep a record of users that have opted out of a particular thread.

When a message is received at the mail server 410 for a user, the mail server 410 may check each user's thread-id list 430 to see if the user has opted out of a particular thread. This aspect may be enabled by the use of persistent header field(s) for tracking threads—such as the persistent Original-Thread-ID header field. In this embodiment, resources for delivery, storage and/or consequential notification and synchronization mechanisms may be saved by preventing message deposit in the first place. Further, since the message is handled at the mail server 410, there may be no need to consider differing behaviors of different mail clients that may be used by various users. Also, the mail server 410 may notify a user or users when users opt out of the message thread. Other qualifiers and/or qualified header fields facilitating server-side opt out that have additional, fewer, or alternate characteristics and capabilities may be used.

2. Exemplary Client-Side Opt Out

In some embodiments, opt out may be handled at the client-side of a communication utilizing the persistent qualifiers and/or associated qualified header fields of the present disclosure. The mail client (MUA) may record the identifier of a thread that the user wants to opt out from; the identifiers may be recorded in any format and may be stored either locally or remotely. The mail client may pull for mailbox updates periodically, and/or rely on a push notification. Either way, whenever a new message has been deposited, the mail client may verify the persistent header field(s) for tracking threads—such as the Original-Thread-ID header field—in the deposited message versus the stored opt-out identifiers. If there's a match, the mail client may delete the message, preventing it from reaching the user. Alternatively, depending on policies, custom rules or software implementation, the mail client may move messages to another mailbox (such as 'Deleted items', 'Spam' or 'Read later'), effectively organizing the messages rather than deleting them. The term "mail client" is further defined elsewhere herein. The present embodiments may also be used in conjunction with other mail clients having additional, less, or alternate capabilities.

Figure 5:
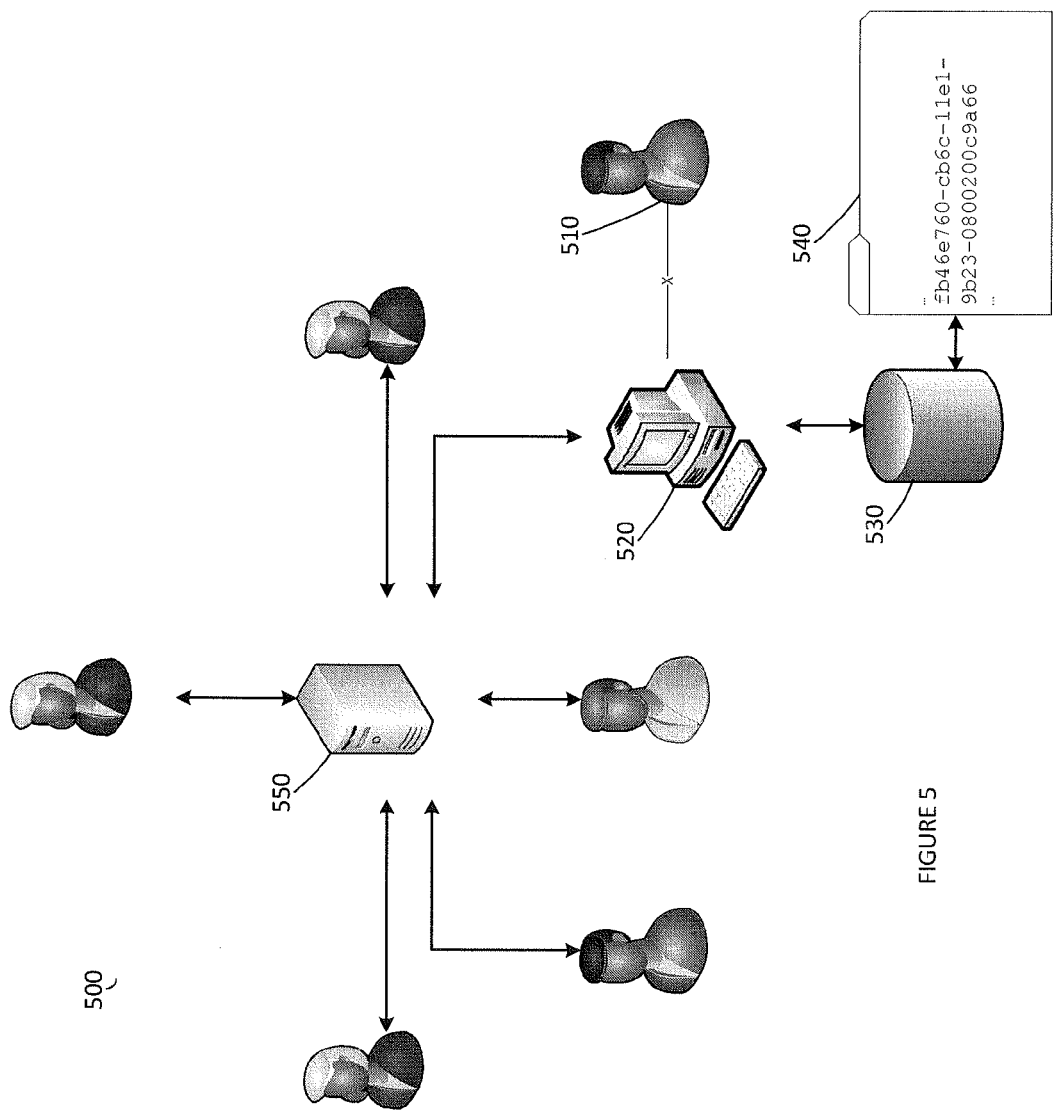
FIG. 5 is a diagram of an exemplary status check and message drop on the client side.

FIG. 5 is a diagram of an exemplary status check and message drop on the client side 500. User 510 may decide to opt-out of a particular message thread. Mail client 520 may comprise a database 530 that may comprise a user's 510 thread-id list 540. Database 530 may be stored locally or remotely, the latter providing the benefit of accessing it from anywhere by any mail client of user 510. Mail client 520 may add the Original-Thread-ID header value related to the thread that the user has opted out of to thread-id list 540.

When a message is received at the mail client 520 from mail server 550, the mail client 520 may check the Original-Thread-ID header value of the received message against the Original-Thread-ID header values stored in the thread-id list 540. If there is a match, the mail client 520 may delete or otherwise store the received message. If there is no match, the mail client 520 may present the message to the user 510.

In the case of a client-side opt out, the message may always be delivered to a mail client from the mail server, thus more resources may be used when the client-side opt out is used. Further, there may be an impact on the behavior of other clients involved in the thread, e.g., race conditions and synchronizing. Moreover, since every message is delivered to the mail client, if the mail client is on a mobile device, verifying each incoming message may consume extra processing power/battery power. Lastly, it may be difficult for administrative policies to be enforced on mail clients that are not in control of the administrator. Other qualifiers and/or qualified header fields facilitating client-side opt out that have additional, fewer, or alternate characteristics and capabilities may be used.

B. Exemplary Closing Threads

In some embodiments, the persistent qualifiers and/or associated qualified header fields of the present disclosure may facilitate the closing of threads. For instance, the originator of the first message may want to close a discussion (e.g., thread) for various reasons. For example, because there's a mistake in the content of the message, the message has been sent to the wrong address(es), all required information has been divulged from the recipients, security reasons, preference to initiate follow-up discussions via a different medium, etc.

Closing a thread may be a server-side feature as the server may be best suited to prevent the sending of messages. Based upon the deployment model, several alternative mechanisms may be designed to close a thread that carries persistent header field(s) for tracking threads—such as the Original-Thread-ID header field—or a similar field sufficient for the same purpose.

Examples of such alternatives include but are not limited to: a LISTSERV-like mechanism (the user—typically the originator—who wants to close a thread may send a specifically formatted email to a mailing list designed for this purpose); a database/file may be created that contains identifiers of closed threads; or other mechanisms that prevent the sending of a selected message. The user may use any one of these mechanisms, or other mechanism, to close a thread. However, the server may prevent the user from closing a thread, based on administrative policies.

On successfully closing the thread, the server may record the thread-id. Once a thread is closed, the server may prevent messages related to the original thread from being sent, such as by verifying the appropriate header field and dropping the messages with matching identifiers. Additionally, depending upon policies, custom rules or software implementation, the server may send a message to the user who attempts to forward/reply to a closed thread.

Figure 6:
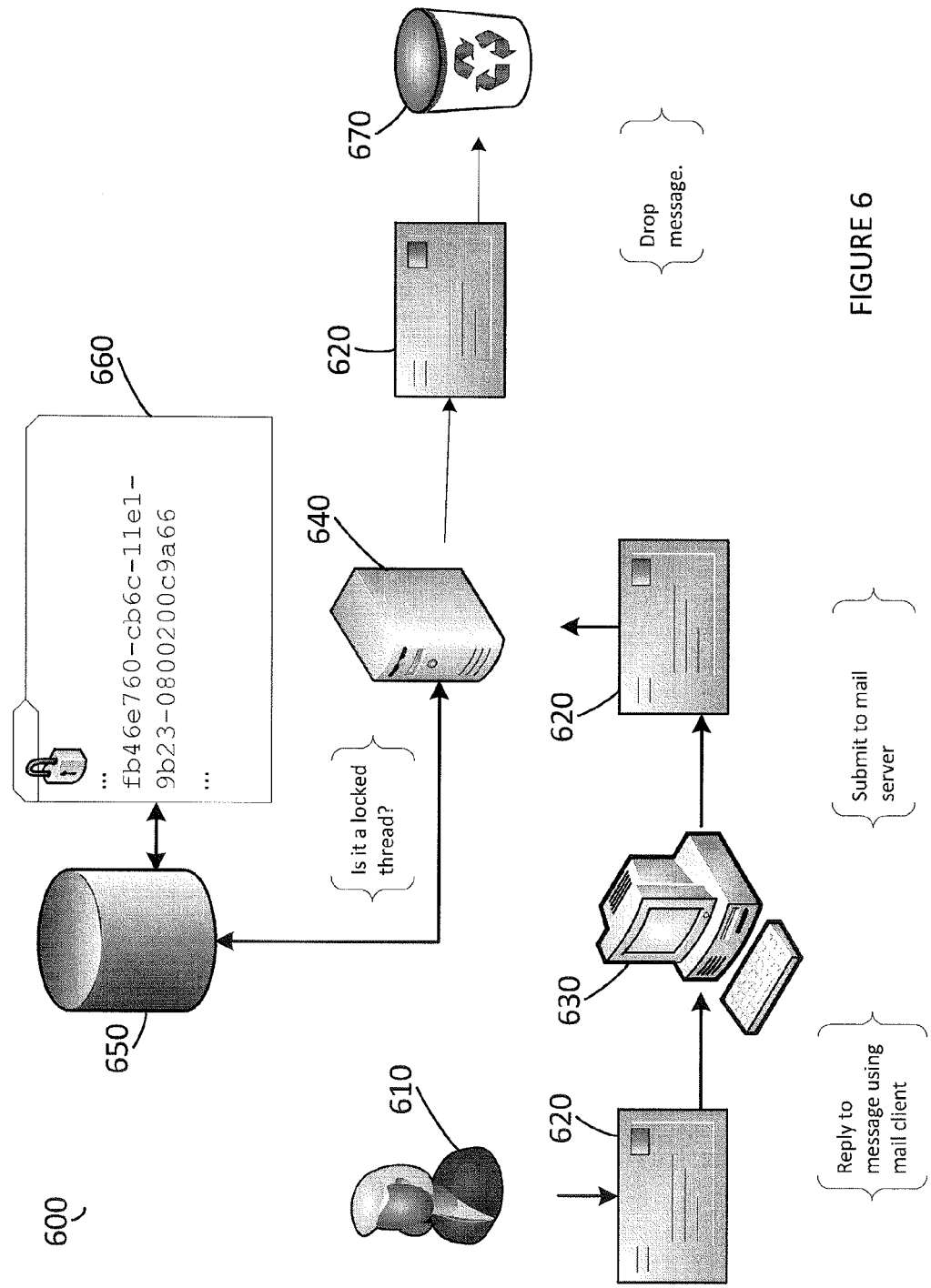
FIG. 6 is a diagram of an exemplary status check and message drop on submission.

FIG. 6 is a diagram of an exemplary status check and message drop on submission 600. User 610 may reply to a thread with an electronic message 620. Message 620 may comprise an Original-Thread-ID header field with a value selected based upon the thread replied to. Mail client 630 may submit the message 620 to mail server 640. Mail server 640 may comprise a database 650. Database 650 may comprise a table 660 of closed threads; entries may be made in table 660 when a user closes a thread, when the mail server 640 determines a thread should be closed, when an administrative entity forces closing threads, etc. The closed threads may be identified in table 660 by their Original-Thread-ID header field value.

When a message 620 is submitted at the mail server 640 from mail client 630, the mail server 640 may check the Original-Thread-ID header value of the submitted message 620 against the Original-Thread-ID header values stored in table 660. If the Original-Thread-ID header field value of the message 620 matches an entry in table 660, then mail server 640 may move the message 620 to trash 670 (i.e., delete message 620) without forwarding to the members of the thread. On the other hand, if the Original-Thread-ID header field value of the message 620 does not match an entry in table 660, then mail server 640 may forward the message 620 to the members of the thread.

In the case where the mail server 640 deletes the message 620 without forwarding, the mail server 640 may create and send a notification to user 610 that the thread has been closed. Other qualifiers and/or qualified header fields facilitating closing thread functionality having additional, fewer, or alternate characteristics and capabilities may be used.

C. Exemplary Advanced Message Tracing

In some embodiments, the qualifiers and/or associated qualified headers or qualified header fields of the present disclosure may enable message tracing. Message tracing may be described as a technique where functional entities (e.g., MUA, MHS, and MTA) may add information about themselves to message headers as messages pass through them. Message tracing may allow reading the message headers at any time to determine where the electronic message has passed through. The qualified headers or header fields that enable message tracing may utilize the persistent qualifiers and/or the index qualifiers discussed herein, or both.

In the current state of art, Simple Mail Transfer Protocol (SMTP) requires adding tracing fields (using the Received header field), which implies the following limitations for SMTP message tracing: it applies to MHSes and MTAs only and fields may be dropped because they are not persistent, thus the original sender may never get them in a reply message.

In order to address these problems and others, a persistent qualifier, an index qualifier, and/or a qualifier having the characteristics of both persistent and index qualifiers may be used. In one embodiment, a persistent PersistentTrace header may be used. The persistent nature of tracing fields may allow true tracing, allowing MUAs to keep tracing information on reply/forward and even add their own—ultimately allowing the originator to find out where the message passed through, from message creation.

Persistent tracing may be requested, for example, by adding a persistent header field to the email: p.Persistent-Trace. Note: the 'p.' prefix may indicate the header's persistent nature. While the PersistentTrace header may be added to any message during a message exchange, once added, it may not be removed or altered (due to its persistent nature). The PersistentTrace header may also be injected into each message's header based on, for example, an enterprise policy.

The persistent header field may also be an index header field and/or otherwise have index qualifier-related characteristics or values. For instance, the value of the Persistence-Trace header field may be an integer number, optionally followed by a semicolon and extension fields. The integer number may indicate the number of replies that should be traced. The value of 0 may be reserved, to indicate that there is no limit; all replies would need to be traced persistently, indefinitely. Negative values may be reserved for future use. The ABNF syntax of the persistent trace header may read:

field-name="PersistentTrace"
    field-body=integer-decimal [extension-parameters]
    integer-decimal=*1"−" 1*DIGIT Leading zeroes shall be omitted.
    extension-parameters=extension-parameter *(";" extension-parameter)
    extension-parameter=<as defined in the future extension>

Using the syntax described above, an example of a qualified header used for infinite tracing may read:

p.PersistentTrace: 0

Again note the use of the exemplary persistence qualifier "p" to indicate to various entities that the header field is persistent. Alternatively, the exemplary index qualifier "i" may be used to indicate that to various entities that qualifier has indexing-related purposes, such as message tracing.

The sending MUA may add its own persistent tracing field:

p.Received: by sending.client.net . . . ; Mon, 11 Mar. 2013 08:40:18 −0700 (PDT)

Each functional entity where the message passes through may look for the PersistentTrace header field. If found with a value of 0, the functional entity may add its own information without an index:

p.Received: from foo.net . . . ; Mon, 11 Mar. 2013 11:40:19 −0400
    p.Received: from foo.org . . . ; Mon, 11 Mar. 2013 15:40:18 +0000 (GMT)
    p.Received: by foo.com . . . ; Mon, 11 Mar. 2013 08:40:18 −0700 (PDT)

The receiving MUA, upon reply, may look for the PersistentTrace header field. If found, since the value is 0, the receiving MUA may add its own information without an index:

p.Received: by replying.client.net . . . ; Mon, 11 Mar. 2013 09:23:45 −0700 (PDT)

Using the syntax described above, an example of a header used for limited tracing may read:

p.PersistentTrace: 1

The sending MUA may also add its own persistent tracing field (including the index 0):

p.i=0.Received: by sending.client.net . . . ; Mon, 11 Mar. 2013 08:40:18 −0700 (PDT)

Each functional entity where the message passes through may check for the PersistentTrace header field. If the PersistentTrace header field is found with a value of a positive integer, the functional entity may compare the positive integer with the index in the previous Received header field. If the positive integer is greater or equal, the functional entity may add its own information using the same index:

p.i=0.Received: from foo.net . . . ; Mon, 11 Mar. 2013 11:40:19 −0400 p.i=0.Received: from foo.org . . . ; Mon, 11 Mar. 2013 15:40:18 +0000 (GMT)

p.i=0.Received: by foo.com . . . ; Mon, 11 Mar. 2013 08:40:18 −0700 (PDT)

The receiving MUA, upon reply, may check for the PersistentTrace header field. If the PersistentTrace header field is found with a value of a positive integer, the receiving MUA may retrieve the index in the previous Received header field and increase that index by one. If the resulting index is equal or less than the value in the PersistentTrace header field, the receiving MUA may add its own information using the resulting index:

p.i=1.Received: by replying.client.net . . . ; Mon, 11 Mar. 2013 09:23:45 −0700 (PDT)

The qualified headers or header fields of the present embodiments that may enable message tracing functionality may employ persistent and/or index qualifiers with additional, less, or alternate characteristics and capabilities.

It should be noted that in contrast to the above examples, in the current state of art, SMTP permits loop detection by simply counting the number of Received header fields. As the number of Received header fields is increasing, implementations based on such simplistic loop detection algorithms may be prone to report false positives.

D. Exemplary Advanced Message Tracking

In some embodiments, the qualifiers and/or associated qualified headers or qualified header fields of the present disclosure may enable message tracking. Message tracking may be described as a technique where functional entities (MUA, MHS, and MTA) generate report(s) about emails passing through them, deposited by them, or accessed through them (by their users). These reports may allow following an email or other electronic message and determine when and where the email or other electronic message has passed through, been received, or been managed. An example of message tracking is Delivery Status Notifications (DSNs), a.k.a. delivery reports. Tracking emails may be used as a tool to identify security holes, leaks, and network bottlenecks, which may require tracking beyond the point of successful delivery, for example, when emails or other electronic messages are forwarded or replied to. The qualified headers or header fields that enable message tracking may utilize the persistent qualifiers and/or index qualifiers discussed herein, or both.

DSN may be enhanced through the use qualified headers. In the current state of art, DSNs are limited to send reports only to the originator of the message. In order to track the previous originators when the message is forwarded/replied to, the previous originators may need to be added into persistent headers, in some embodiments to the same header that indicates requesting the persistent tracking itself.

Persistent tracking may be requested, for example, by adding a persistent header field to the email: p.PersistentTrack. Note: the 'p.' prefix indicates its persistent nature. While the PersistentTrack header may be added to any email during an email exchange, once added, it may not be removed or altered (due to its persistent nature). The PersistentTrack header may also be injected into each email's header based on, for example, an enterprise policy.

The value of the PersistentTrack header field may be the originator's email address followed by a semicolon and a series of tokens (or a wildcard to represent all tokens), and optionally, another semicolon followed by extension fields. The tokens may be similar to the 'Action' fields described in Internet Engineering Task Force (IETF) RFC3464 "An Extensible Message Format for Delivery Status Notifications". Additional tokens may be defined as necessary to enable message tracking. The originator may choose to include only those tokens that correspond to an action that the originator is actually interested in, or, request all actions be tracked by omitting the tokens as a whole. Extension fields may be included to ensure future extensibility.

Based upon the following syntax:
header-field=field-name ":" field-body CRLF
field-name=1*VCHAR
field-body=<see RFC5322>
address=mailbox/group
mailbox=name-addr/addr-spec
name-addr=[display-name] angle-addr
angle-addr=[CFWS] "<" addr-spec ">" [CFWS]/obs-angle-addr
group=display-name ":" [group-list] ";" [CFWS]
display-name=phrase
mailbox-list=(mailbox *("," mailbox))/obs-mbox-list
address-list=(address *("," address))/obs-addr-list
group-list=mailbox-list/CFWS/obs-group-list
action-value="failed"/"delayed"/"delivered"/"relayed"/"expanded"
the syntax of the PersistentTrack header may read:
field-name="PersistentTrack"
field-body=address ";" ("*"/action-tokens) [extension-parameters];
"*" represents a combination of all action-value tokens.
action-tokens=action-value *(SP action-value)
extension-parameters=extension-parameter *(";" extension-parameter)
extension-parameter=<as defined in the future extension>

As an example, a sending MUA may request persistent tracking using the following header:

p.PersistentTrack: Me, MySelf, and I<mememe@foo.com>;delivered relayed expanded

Note that the exemplary qualified header field above is associated with the action values of "delivered," "relayed," and "expanded." Shown above, qualified header fields may include a number of action-values, such as "failed" (that may indicate message delivery failed); "delayed" (which may indicate that message delivery is or was delayed), "delivered" (which may indicate that the message was successfully delivered and to what entity or entities it was delivered), "relayed" (which may indicate that the message was relayed, such as forwarded or replied to, and to what entity or entities it was relayed), and/or "expanded" (which may indicate additional entities to which the message was relayed). Additional, fewer, or alternate action-values may be used.

Also, again note the use of the exemplary persistence qualifier "p" to indicate to various entities that the header field is persistent. Alternatively, the exemplary index qualifier "i" may be used to indicate that to various entities that qualifier has indexing-related purposes, such as message tracking.

Each functional entity where the message passes through may look for the PersistentTrack header fields (there may be more of them as each originator may add its own). An originator may be a user who (a) creates, (b) replies to, (c) forwards, or performs other operations on a message, an administrator, or other entity with access to the message. For each PersistentTrack header field found, the following may apply: the functional entity may verify whether the event is actionable (i.e., whether the action it performs matches an action requested to be tracked); and if the event is actionable, the functional entity may generate a DSN for the originator in the PersistentTrack header field. The receiving MUA, upon forward or reply, may also add its own PersistentTrack header field.

In some embodiments, a policy may exist, such that another PersistentTrack header may also be injected into each email's header using an email address other than the originator's address, for example it@foo.com, to track emails. In this case, the address indicated in the header may also receive tracking reports, like any other originator. However, since there's no way to validate tracking addresses, there may be a number of security issues that need to be considered. In order to avoid abuse, such as tempering/spying, either of the following maybe employed: limit the tracking within the boundaries of the service (i.e., company email) by capturing and eliminating reports destined outside of the service, or, require digital signatures and permit sending reports only in case the email is correctly signed and originates from a trustworthy source.

The qualifier and associated qualified headers and header fields of the present embodiments that enable message tracing functionality may use persistent and/or index qualifiers with additional, less, or alternate characteristics and capabilities.

IV. Exemplary Methods

The present embodiments may provide methods of electronic messaging. The methods may generate, send, receive, and/or modify qualifiers and/or associated qualified electronic message headers or header fields as a means of relaying information about electronic messages among various entities. The qualifiers and/or associated qualified electronic message headers or header fields may facilitate various entities employing or providing additional electronic message-related functionality.

For instance, in one aspect, the methods may comprising generating a "persistent qualifier" and/or associated persistently qualified header or header field. The persistent qualifier and/or associated qualified header or header field may provide electronic message functionality that (1) indicates the persistent or unchangeable nature of the header or header field, and may not be alterable or modified by various entities that send or receive an electronic message associated with the qualifier and/or associated header or header field; (2) preserves specific headers or header fields and/or information contained therein as an electronic message travels along or among various UE's, devices, servers, etc., such as to facilitate email originator identification; (3) allows a server or other processing device to recognize that a user associated with an electronic or email address has already opted out of an electronic message or email string or group, and thus avoids delivery to that user of an electronic message associated with that string or group; (4) allows closure of threads; (5) allows electronic message tracing, such as allowing the originator or a server to find out where the message has passed, from the very beginning; (6) allows electronic message tracking, such as allowing entities to generate reports detailing where emails have been, who originated them, who has accessed or forwarded them, etc.; and/or (7) other electronic message-related functionality, including that disclosed elsewhere herein.

Figure 7:
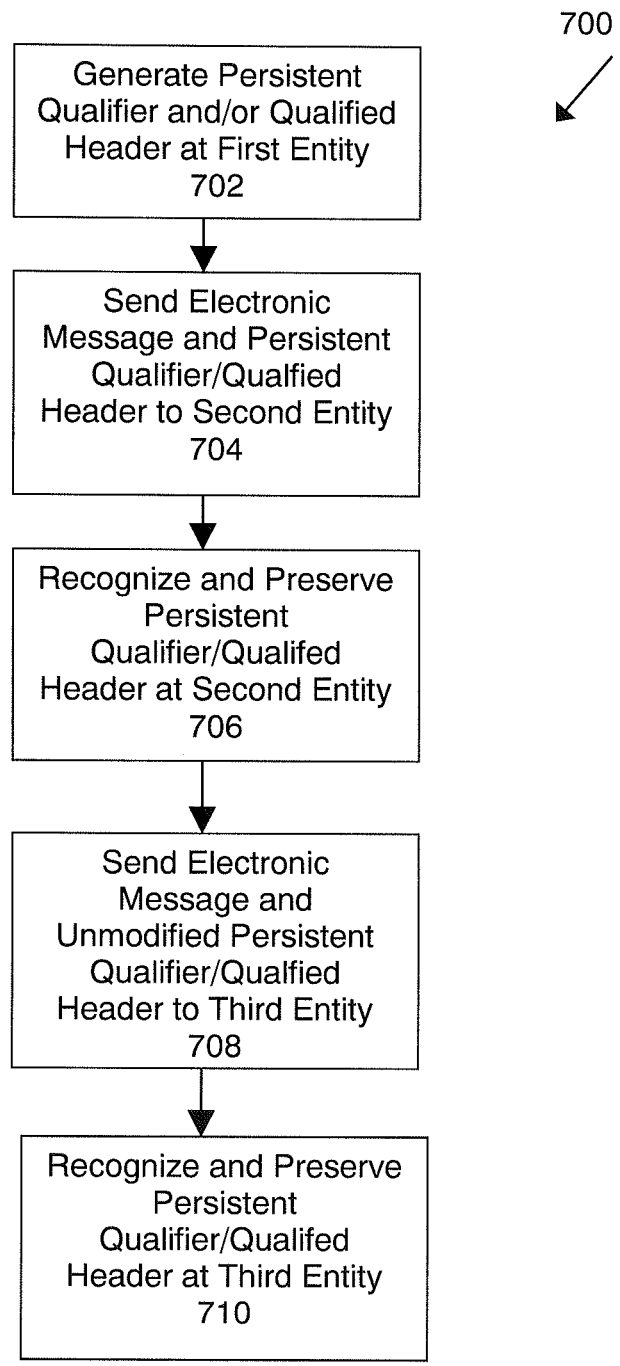
FIG. 7 is an exemplary method of implementing electronic message-related functionality.

FIG. 7 depicts an exemplary method of electronic messaging 700 that facilitates electronic message-related functionality. The method 700 may include, at a first entity, creating or generating the persistent qualifier and/or associated qualified header or header field 702, such as via a processor. After or during generation, the persistent qualifier and/or qualified header or header field may be attached or associated with an electronic message. The persistent qualifier may (1) indicate the persistent nature of the header or header field to various entities; (2) preserve specific headers or header fields and/or information contained therein, such as (a) originator identification; (b) an indication that the user generating the persistent qualifier has opted out of email or other electronic messaging string or group; (c) an indication that a thread should be closed; (d) an indication of the identity of the first entity; (e) an indication of actions that the first entity performs on the electronic message associated with the qualifier, such as replying to or forwarding, (f) an indication of what entities through which the electronic message has passed to facilitate message tracing or tracking; and/or (g) other indications that are to be preserved by the next entity or entities receiving the electronic message and qualified header. During the generation of the persistent qualifier and/or associated qualified header or header field, the first entity may also create via a processor various tokens, action values, and/or other parameters or values, including those discussed elsewhere herein, and add them into the qualified header field to further facilitate achieving the foregoing functionality in conjunction with the persistent qualifiers.

The method 700 may include sending the electronic message, along with the persistent qualifier and/or qualified header or header field (and contents thereof, such as the persistent qualifier, tokens, action values, and other parameters), from the first entity to a second entity 704. The electronic message may be transmitted from the first entity to the second entity over a wired or wireless communications network. The first, second, and third entities (mentioned below) may be mobile devices, UEs, network elements, servers, computer systems, and/or other computing devices capable of electronic messaging.

The method 700 may include, at the second entity, receiving the electronic message and recognizing the persistent qualifier in the qualified header or header field 706 associated with the electronic message received. The recognition by the second entity that the electronic message is associated with a qualified header or header field containing a persistent qualifier may indicate to the second entity that the qualified header or contents of the header field associated with the electronic message is to be preserved and/or left unaltered by the second entity. The second entity may read or recognize the contents of the qualified header field, including the persistent qualifier, tokens, action values, and other parameters. The second entity may recognize that each value of the qualified header field (e.g., persistent qualifier, tokens, action values, and other parameters) may have pre-designated functionality, such as the described above.

The method 700 may include, at the second entity, relaying or sending the electronic message along with the qualifier and/or unmodified qualified header or header field (and contents thereof) to a third entity 708. As a result, a qualifier, token, parameter, action value, and/or other information generated by the first entity about the associated electronic message may be passed onto entities other than the second entity intact and without modification by the second entity. This may facilitate both the second entity and other downstream entities recognizing (from the contents of the header field, such as the qualifier, tokens, action values, or other parameters) (a) the persistent nature of the qualified header or header field; (b) the identification of the electronic message originator; (c) whether a user has previously opted out of an electronic message string or group; (d) what actions the first entity performed on the electronic message; (e) an indication of what entities through which the electronic message has passed to facilitate message tracing or tracking; and other information associated with the electronic message.

The method 700 may include, at the third entity, receiving the electronic message and recognizing the persistent qualifier in the qualified header or header field of the electronic message received 710. The recognition of the persistent qualifier and/or associated qualified header or header field (and contents thereof) may indicate to the third entity, as noted above with respect to the second entity, that the qualified header or content of the header field associated with the electronic message is to be preserved and/or left unaltered by the third entity. The method may further include, at the third entity, relaying or sending the electronic message along with the qualifier and/or unmodified contents of the qualified header or header field (qualifier, tokens, action values, and/or other parameters) from the third entity to yet another entity; and so on. The method may include additional, fewer, or alternate actions.

In another aspect, the method may include generating an "index qualifier" and/or associated header or header field. The index qualifier and/or associated header or header field (and contents thereof, such as the index qualifier, tokens, action values, and/or other parameters or values) may provide electronic message functionality that (1) facilitates the ordering and/or re-ordering of header fields; (2) allows message tracing; (3) allows message tracking; and/or (4) other electronic message-related functionality, including that discussed elsewhere herein.

In one embodiment, the contents of the qualified header field may include a qualifier, one or more tokens, one or more action values, and/or other parameters or values. Additionally or alternatively, the qualifier, one or more tokens, one or more action values, and/or other parameters or values discussed herein may be linked or associated with the qualified header field via other means, such as via pointers, separate or related fields, trees, lists, arrays, queues, or other data structures.

In another embodiment, a method of electronic messaging may be provided. The method may include receiving, at a first entity, an electronic message generated by an originating entity, the electronic message having an header field and a qualifier associated with the header field; preserving, at the first entity, all content of the header field when the qualifier is recognized as a persistent qualifier; and transmitting the electronic message along with the header field in an unmodified state from the first entity to another entity to facilitate electronic message-related functionality at or among various entities. The functionality facilitated by the use of persistent headers and accomplished at various entities may include originator identification, user opt out of strings or groups, message tracking, message tracing, thread closure, and/or other functionality discussed herein. The various entities may include UEs, network elements, servers, and/or other computing or wireless communications devices.

In another embodiment, a method of electronic messaging may be provided. The method include generating a persistent qualifier that indicates that an electronic message header field is of a persistent nature and is not to be modified by entities receiving an electronic message associated with the electronic message header field; and transmitting the electronic message along with the electronic message header field to an entity such that the entity receiving the electronic message may recognize that the persistent qualifier in the electronic message header field is of a persistent nature such that the entity receiving the electronic message does not modify any content of the electronic message header field, including the persistent qualifier. The persistent qualifier may facilitate (a) preserving all header fields of an electronic message as the electronic message travels from entity to entity; (b) an entity recognizing that a user has previously opted out of electronic message string or group; (c) a closure of a thread; (d) message tracking or tracing; (e) originator identification by other entities; (f) preserving and passing user-defined rules associated with an electronic message among entities; and/or other functionality.

In another embodiment, a method of electronic messaging may be provided. The method may include generating, at a first entity (such as a UE, server, network element, etc.), a persistent qualifier that indicates that an electronic message header field is to be preserved by entities receiving an electronic message associated with the electronic message header field; and transmitting the electronic message along with the electronic message header field to a second entity such that the second entity receiving the electronic message may recognize the persistent qualifier in the electronic message header field and then preserve all content of the electronic message header field, including the persistent qualifier. The method may include transmitting the electronic message from the second entity to a third entity unmodified such that the persistent qualifier and/or other contents of the electronic message header field reach the third entity from the first entity via the second entity unchanged to facilitate electronic message-related functionality. The electronic message-related functionality enabled by the persistent header may include message tracking or message tracing, user opt out of a string or group, remote originator identification, thread closure, and/or other functionality discussed herein.

V. Exemplary Systems

Figure 8:
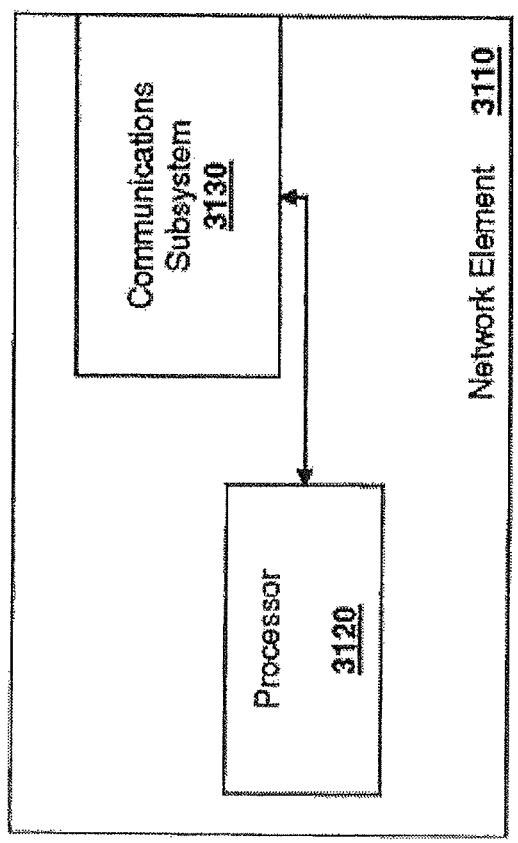
FIG. 8 is a diagram of an exemplary simplified network element.

Certain embodiments above may be implemented by a network element. An exemplary simplified network element is shown with regard to FIG. 8. In FIG. 8, network element 3110 includes a processor 3120 and a communications subsystem 3130, where the processor 3120 and communications subsystem 3130 cooperate to perform the methods described above.

Further, certain embodiments may be implemented by a UE. One exemplary device is described below with regard to FIG. 9. UE 3200 is typically a two-way wireless communication device having voice and data communication capabilities. UE 3200 generally has the capability to communicate with other computer systems on the Internet. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 3200 is enabled for two-way communication, it may incorporate a communication subsystem 3211, including a receiver 3212 and a transmitter 3214, as well as associated components such as one or more antenna elements 3216 and 3218, local oscillators (LOs) 3213, and a processing module such as a digital signal processor (DSP) 3220. As will be apparent to those skilled in the field of communications, the particular design of the communication subsystem 3211 will be dependent upon the communication network in which the device is intended to operate.

Network access requirements will also vary depending upon the type of network 3219. In some networks network access is associated with a subscriber or user of UE 3200. A UE may require a removable user identity module (RUIM) or a subscriber identity module (SIM) card in order to operate on a network. The SIM/RUIM interface 3244 is normally similar to a card-slot into which a SIM/RUIM card can be inserted and ejected. The SIM/RUIM card can have memory and hold many key configurations 3251, and other information 3253 such as identification, and subscriber related information.

When required network registration or activation procedures have been completed, UE 3200 may send and receive communication signals over the network 3219.

Signals received by antenna 3216 through communication network 3219 are input to receiver 3212, which may perform such common receiver functions as signal amplification, frequency down conversion, filtering, channel selection and the like. Analog to digital (A/D) conversion of a received signal allows more complex communication functions such as demodulation and decoding to be performed in the DSP 3220. In a similar manner, signals to be transmitted are processed, including modulation and encoding for example, by DSP 3220 and input to transmitter 3214 for digital to analog (D/A) conversion, frequency up conversion, filtering, amplification and transmission over the communication network 3219 via antenna 3218. DSP 3220 not only processes communication signals, but also provides for receiver and transmitter control. For example, the gains applied to communication signals in receiver 3212 and transmitter 3214 may be adaptively controlled through automatic gain control algorithms implemented in DSP 3220.

UE 3200 generally includes a processor 3238 which controls the overall operation of the device. Communication functions, including data and voice communications, are performed through communication subsystem 3211. Processor 3238 also interacts with further device subsystems such as the display 3222, flash memory 3224, random access memory (RAM) 3226, auxiliary input/output (I/O) subsystems 3228, serial port 3230, one or more keyboards or keypads 3232, speaker 3234, microphone 3236, other communication subsystem 3240 such as a short-range communications subsystem and any other device subsystems generally designated as 3242. Serial port 3230 can include a USB port or other port known to those in the art.

Figure 9:
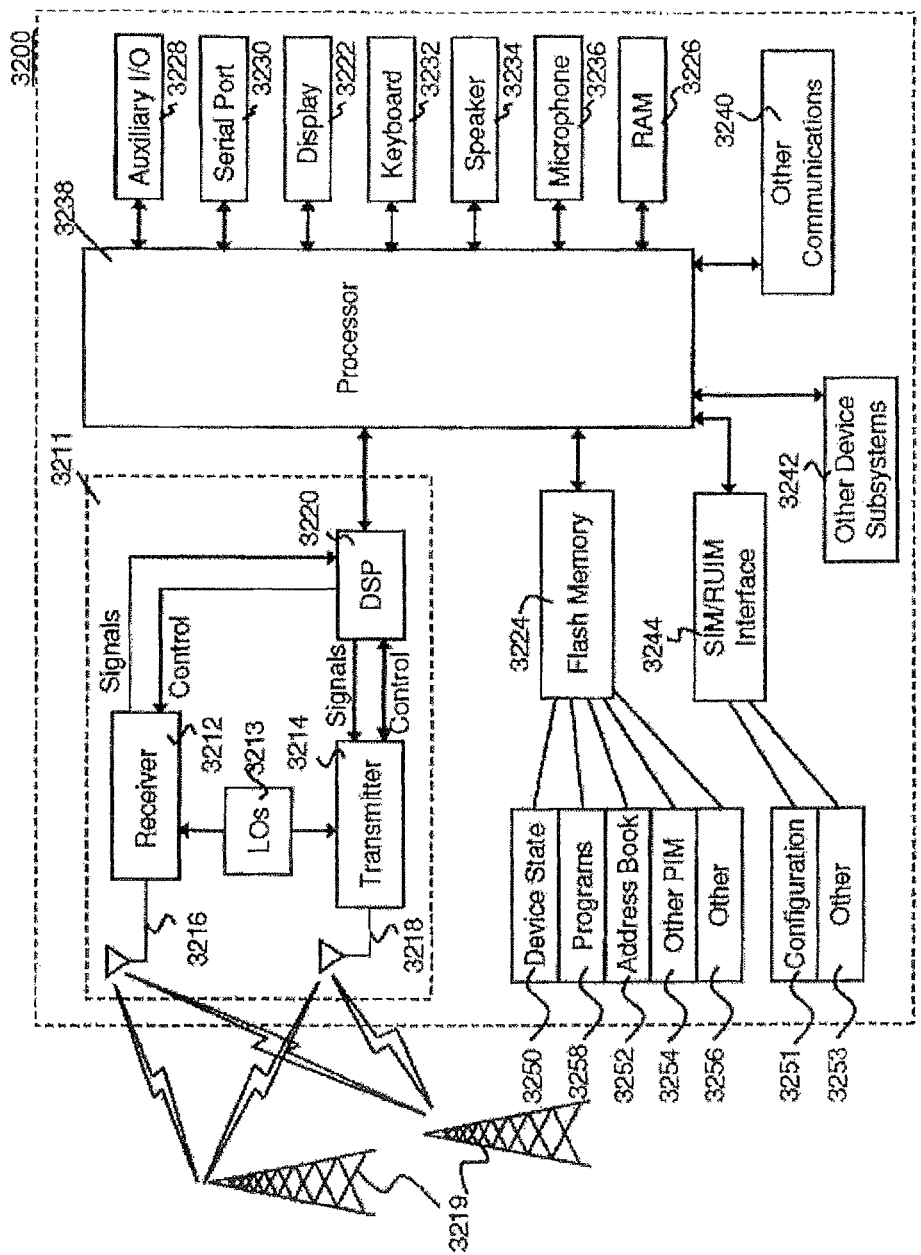
FIG. 9 is a diagram of an exemplary user equipment.

Some of the subsystems shown in FIG. 9 perform communication-related functions, whereas other subsystems may provide "resident" or on-device functions. Notably, some subsystems, such as keyboard 3232 and display 3222, for example, may be used for both communication-related functions, such as entering a text message for transmission over a communication network, and device-resident functions such as a calculator or task list.

Operating system software used by the processor 3238 may be stored in a persistent store such as flash memory 3224, which may instead be a read-only memory (ROM) or similar storage element (not shown). Those skilled in the art will appreciate that the operating system, specific device applications, or parts thereof, may be temporarily loaded into a volatile memory such as RAM 3226. Received communication signals may also be stored in RAM 3226.

As shown, flash memory 3224 can be segregated into different areas for both computer programs 3258 and program data storage 3250, 3252, 3254 and 3256. These different storage types indicate that each program can allocate a portion of flash memory 3224 for their own data storage requirements. Processor 3238, in addition to its operating system functions, may enable execution of software applications on the UE. A predetermined set of applications that control basic operations, including at least data and voice communication applications for example, will normally be installed on UE 3200 during manufacturing. Other applications may be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores may be available on the UE to facilitate storage of PIM data items. Such PIM application may have the ability to send and receive data items, via the wireless network 3219. Further applications may also be loaded onto the UE 3200 through the network 3219, an auxiliary I/O subsystem 3228, serial port 3230, short-range communications subsystem 3240 or any other suitable subsystem 3242, and installed by a user in the RAM 3226 or a non-volatile store (not shown) for execution by the processor 3238. Such flexibility in application installation increases the functionality of the device and may provide enhanced on-device functions, communication-related functions, or both. For example, secure communication applications may enable electronic commerce functions and other such financial transactions to be performed using the UE 3200.

In a data communication mode, a received signal such as a text message or web page download will be processed by the communication subsystem 3211 and input to the processor 3238, which may further process the received signal for output to the display 3222, or Alternatively to an auxiliary I/O device 3228.

A user of UE 3200 may also compose data items such as email messages for example, using the keyboard 3232, which may be a complete alphanumeric keyboard or telephone-type keypad, among others, in conjunction with the display 3222 and possibly an auxiliary I/O device 3228. Such composed items may then be transmitted over a communication network through the communication subsystem 3211.

For voice communications, overall operation of UE 3200 is similar, except that received signals may typically be output to a speaker 3234 and signals for transmission may be generated by a microphone 3236. Alternative voice or audio I/O subsystems, such as a voice message recording subsystem, may also be implemented on UE 3200. Although voice or audio signal output is preferably accomplished primarily through the speaker 3234, display 3222 may also be used to provide an indication of the identity of a calling party, the duration of a voice call, or other voice call related information for example.

Serial port 3230 in FIG. 9 may normally be implemented in a personal digital assistant (PDA)-type UE for which synchronization with a user's desktop computer (not shown) may be desirable, but is an optional device component. Such a port 3230 may enable a user to set preferences through an external device or software application and may extend the capabilities of UE 3200 by providing for information or software downloads to UE 3200 other than through a wireless communication network. The Alternate download path may for example be used to load an encryption key onto the device through a direct and thus reliable and trusted connection to thereby enable secure device communication. As will be appreciated by those skilled in the art, serial port 3230 can further be used to connect the UE to a computer to act as a modem.

Other communications subsystems 3240, such as a short-range communications subsystem, is a further optional component which may provide for communication between UE 3200 and different systems or devices, which need not necessarily be similar devices. For example, the subsystem 3240 may include an infrared device and associated circuits and components or a Bluetooth™ communication module to provide for communication with similarly enabled systems and devices. Subsystem 3240 may further include non-cellular communications such as WiFi or WiMAX.

The UE and other components described above might include a processing component that is capable of executing instructions related to the actions described above. As used herein, the term instructions may include reserved words which cause one or more processors to take certain computational, memory-related or control actions or to send computational, memory-related or control signals. As used herein, the term program may include a collection of computer instructions. FIG. 10 illustrates an example of a system 3300 that includes a processing component 3310 suitable for implementing one or more embodiments disclosed herein. The processing component 3310 may be substantially similar to the processor 3120 of FIG. 8 and/or the processor 3238 of FIG. 9.

In addition to the processor 3310 (which may be referred to as a central processor unit or CPU), the system 3300 might include network connectivity devices 3320, random access memory (RAM) 3330, read only memory (ROM) 3340, secondary storage 3350, and input/output (I/O) devices 3360. These components might communicate with one another via a bus 3370. In some cases, some of these components may not be present or may be combined in various combinations with one another or with other components not shown. These components might be located in a single physical entity or in more than one physical entity. Any actions described herein as being taken by the processor 3310 might be taken by the processor 3310 alone or by the processor 3310 in conjunction with one or more components shown or not shown in the drawing, such as a digital signal processor (DSP) 3380. Although the DSP 3380 is shown as a separate component, the DSP 3380 might be incorporated into the processor 3310.

The processor 3310 executes instructions, codes, computer programs, or scripts that it might access from the network connectivity devices 3320, RAM 3330, ROM 3340, or secondary storage 3350 (which might include various disk-based systems such as hard disk, floppy disk, or optical disk). While only one CPU 3310 is shown, multiple processors may be present. Thus, while instructions may be discussed as being executed by a processor, the instructions may be executed simultaneously, serially, or otherwise by one or multiple processors. The processor 3310 may be implemented as one or more CPU chips and may be a hardware device capable of executing computer instructions.

The network connectivity devices 3320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, universal mobile telecommunications system (UMTS) radio transceiver devices, long term evolution (LTE) radio transceiver devices, worldwide interoperability for microwave access (WiMAX) devices, and/or other well-known devices for connecting to networks. These network connectivity devices 3320 may enable the processor 3310 to communicate with the Internet or one or more telecommunications networks or other networks from which the processor 3310 might receive information or to which the processor 3310 might output information. The network connectivity devices 3320 might also include one or more transceiver components 3325 capable of transmitting and/or receiving data wirelessly.

The RAM 3330 might be used to store volatile data and perhaps to store instructions that are executed by the processor 3310. The ROM 3340 is a non-volatile memory device that typically has a smaller memory capacity than the memory capacity of the secondary storage 3350. ROM 3340 might be used to store instructions and perhaps data that are read during execution of the instructions. Access to both RAM 3330 and ROM 3340 is typically faster than to secondary storage 3350. The secondary storage 3350 is typically comprised of one or more disk drives or tape drives and might be used for non-volatile storage of data or as an over-flow data storage device if RAM 3330 is not large enough to hold all working data. Secondary storage 3350 may be used to store programs that are loaded into RAM 3330 when such programs are selected for execution.

The I/O devices 3360 may include liquid crystal displays (LCDs), touch screen displays, keyboards, keypads, switches, dials, mice, track balls, voice recognizers, card readers, paper tape readers, printers, video monitors, or other well-known input/output devices. Also, the transceiver 3325 might be considered to be a component of the I/O devices 3360 instead of or in addition to being a component of the network connectivity devices 3320.

VI. Exemplary Electronic Message-Related Functionality

The network element (shown in FIG. 8), UE (shown in FIG. 9), and system (shown in FIG. 10) may each have a processor, memory, or other components configured to carry out the electronic message-related functionality disclosed by the present embodiments. The network element, UE, and system may each have a processor that may be configured to use qualifiers and/or qualified electronic message headers or header fields as a means of relaying information about electronic messages among various entities. The qualifiers and associated qualified headers may facilitate various entities employing additional electronic message-related functionality. Additionally or alternatively, each processor may have access to a non-transitory computer readable medium or memory having computer instructions stored thereon that facilitate the processor carrying out the electronic message-related functionality discussed herein.

For instance, in one embodiment, a processor (such as a processor of a network element, UE, system, and/or local or remote server) may be configured to generate, send, receive, read, recognize, or otherwise use a "persistent qualifier" and/or persistently qualified header or header field. The persistent qualifier and/or associated qualified header or header field may provide email, text, or other electronic message functionality that (1) indicates the persistent nature of the header or header field; (2) preserves a specific header or header field and/or information contained therein as an email, text, or other electronic message travels along or among various UE's, devices, servers, etc., such as to facilitate (a) electronic message originator identification and/or (b) user-defined rules to be persistently or consistently applied to the electronic message by various entities; (3) allows a server or other processing device to recognize that a user associated with an electronic address has already opted out of an electronic message string or group, and thus avoids delivery to that user of an electronic message associated with that string or group; (4) allows the closure of electronic message threads; (5) facilitates message tracing; (6) facilitates message tracking; and/or (7) other electronic message-related functionality, including that discussed elsewhere herein.

In another embodiment, a processor (such as a processor of a network element, UE, system, and/or local or remote server) may be configured to use a "persistent qualifier" and/or indexed qualified header or header field. The index qualifier and/or associated qualified header or header field may provide email, text, and/or other electronic message functionality that facilitates (1) the ordering of headers or header fields; (2) message tracing, such as allowing the originator or a server to find out where the electronic message has passed, from the very beginning; (3) message tracking, such as allowing entities to generate reports detailing where electronic messages have been, who originated them, who has accessed or forwarded them, etc.; and/or (4) other electronic message-related functionality, including that discussed elsewhere herein.

In another embodiment, a network element, UE, system, and/or local or remote server may be configured have: (1) means for indicating the persistent nature of an electronic message header or header field; (2) means for preserving a specific electronic message header or header field and/or information contained therein as an email, text, or other electronic message travels along or among various UE's, devices, servers, etc., such as to facilitate (a) electronic message originator identification and/or (b) user-defined rules to be persistently or consistently applied to the electronic message by various entities; (3) means for identification of an electronic message originator; (4) means for persistently applying a user-defined rule (i.e., a rule associated with an electronic message that is defined or established by an individual user or entity) to an electronic message as it travels among different entities; (5) means for recognizing that a user associated with an electronic address has already opted out of an electronic message string or group (to avoid delivery to that user of an electronic message associated with that string or group); (6) means for closing electronic message threads; (7) means for ordering electronic message headers or header fields; (8) means for electronic message tracing—the electronic message tracing allowing the originator or a server to determine where the electronic message has passed, from the very beginning; and/or (9) means for electronic message tracking—the electronic message tracking allowing entities to generate reports detailing where an electronic message has been, who originated it, and/or who has accessed or forwarded it. The "means for" functionality detailed above may be provided to the network, UE, system, or server via (a) a processor configured or programmed to carry out the electronic message-related functionality, and/or (b) a non-transitory computer readable medium or other memory containing computer instructions for carrying out the electronic message-related functionality that may be run on the processor or other computing device.

In another embodiment, a computing or wireless communications device, such as a UE, network element, or server, for electronic messaging may be provided. The computing device may comprise: a processor configured to: (a) receive an electronic message comprising a header field and a qualifier associated with the header field; (b) preserve the header field of the electronic message in an unmodified state if the qualifier is a persistent qualifier; and (c) transmit the electronic message, along with the unmodified header field, to another entity to facilitate the electronic message-related functionality described herein, such as originator identification, opt out, message tracking, message tracing, thread closure, etc. by various entities.

In another embodiment, a computing device, such as a UE, network element, or server, for electronic messaging may be provided. The computing device may comprise a processor configured to: receive an electronic message comprising a header field and a qualifier associated with the header field, wherein the processor may preserve the header field of the electronic message in an unmodified state based upon recognizing that the qualifier is a persistent qualifier and then may transmit the electronic message, along with the unmodified header field, to another entity to facilitate the electronic message-related functionality described herein, such as originator identification, opt out, message tracking, message tracing, thread closure, etc. by various entities.

In another embodiment, a computing device, such as a UE, network element, or server, for electronic messaging may be provided. The computing device may comprise a processor configured to: generate a qualifier associated with a header field of an electronic message; and transmit the electronic message, along with the header field and the qualifier, to a second entity to facilitate the second entity recognizing that the qualifier indicates that the second entity is to preserve the header field in an unmodified state such that any relay of the electronic message by the second entity includes the unmodified header field. The preservation of the header field by the second entity and further downstream/receiving entities may facilitate achieving the electronic message-related functionality discussed herein, such as origination identification, opt out, message tracking, message tracking, thread closure, etc. by various entities.

In another embodiment, a server, network element, or UE may comprise a processor configured to: receive a message comprising a header field and a qualifier associated with the header field; and handle the message based upon the header field and/or the qualifier; and a memory. The processor may be further configured to: receive a second message comprising a header field; and add a qualifier to the header field based upon a policy stored in the memory. The qualifier may be a persistence qualifier, and the header field may be included with a second message based upon the presence of the persistence qualifier, the second message related to the message. The processor may be further configured to: receive an opt out message comprising the thread ID; and drop the message based upon the thread ID. The qualifier may be a persistence qualifier, and the header field may include a thread identification (ID) and/or one or more tokens (the tokens may be from the group consisting of public, internal, locked, unrestricted, restricted, notification, inclusive, and exclusive). The qualifier may be a persistence qualifier and the header field may be a PersistentTrace header, and the processor may be further configured to determine functional entities that the message has passed through based on the header field. Alternatively to a persistent qualifier, the qualifier may be an index qualifier and the processor may organize the header amongst a plurality of additional headers based upon the qualifier.

It should be noted that, as used herein, the term "mail server" may include any individual devices, as well as parallel and distributes systems and transfer agents that are capable of handling email, text, internet, and/or other electronic messages. For example, home servers, enterprise servers (e.g., Exchange and BES), servers of online mail services (e.g., paid mailbox from service provider, free services like Google Mail), etc. These are often referred to as MHS and MTA in relevant standards.

Also, as used herein, the term "mail client" may include a mail client, mail user agent, or any other program capable of presenting email, text, internet, and/or other electronic messages to a user, and/or compose new mails or replies. For example, BlackBerry, Outlook Express, Outlook, Thunderbird, web-based interfaces such as Google Mail, Hotmail, Yahoo, etc. These are often referred to as MUA in relevant standards.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

While several embodiments have been provided in the present disclosure, it should be understood that the disclosed systems and methods may be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein.

What is claimed is:

1. A computing device for electronic messaging, the computing device comprising:
a processor configured to:
receive an electronic mail (email) message generated by an originating entity comprising a mail user agent (MUA), the email message comprising a header field comprising a qualifier and a thread identification (ID);
preserve the header field of the email message in an unmodified state if the qualifier within the header field is a persistent qualifier, wherein the persistent qualifier facilitates user opt out of an electronic message thread or an exchange of emails among a group of MUAs;
increment an index value in the header field if the qualifier within the header field is an index qualifier;
transmit the email message, along with the unmodified header field or the incremented indexed value in the header field, to another entity to facilitate electronic message-related functionality;
receive an opt out message comprising the thread ID, wherein the opt out message is received from a user that has received at least one email message comprising the header field; and
responsive to receiving the opt out message, drop all messages addressed to the user that comprise the thread ID.

2. The computing device of claim 1, wherein the persistent qualifier facilitates electronic message originator identification.

3. The computing device of claim 1, wherein the electronic message thread comprises an initial email and a sequence of emails succeeding the initial email.

4. The computing device of claim 1, wherein the persistent qualifier facilitates message tracing.

5. The computing device of claim 1, wherein the persistent qualifier facilitates message tracking.

6. The computing device of claim 1, wherein the persistent qualifier facilitates electronic message thread closure.

7. The computing device of claim 1, wherein the header field comprises one or more tokens that facilitate electronic-message functionality.

8. The computing device of claim 7, wherein the one or more tokens comprise one or more tokens selected from a group of tokens comprising: a public token permitting any recipient of the email message to modify the email message, an internal token preventing the email message from being transmitted beyond a specific administrative domain, a locked token preventing recipients of the email message from being added/removed, an unrestricted token permitting any recipient to forward or reply to the email message, and a restricted token preventing any recipient from forwarding the email message.

9. The computing device of claim 1, wherein the header field is a PersistentTrace header, and wherein the processor is further configured to use the PersistentTrace header to determine all functional entities through which the email message has passed since the email message was originally created.

10. A method of electronic messaging, the method comprising:
receiving, at a first entity, an electronic mail (email) message generated by an originating entity comprising a mail user agent (MUA), the email message having a header field comprising a qualifier and a thread identification (ID) within the header field;
preserving, at the first entity, all content of the header field in an unmodified state responsive to recognizing that the qualifier within the header field is a persistent qualifier;
transmitting the email message along with the persistent qualifier within the unmodified header field from the first entity to a second entity to facilitate electronic message-related functionality,
wherein the electronic message-related functionality enabled by the persistent qualifier comprises user opt out of electronic message strings or groups;
receiving an opt out message comprising the thread ID, wherein the opt out message is received from a user that has received at least one email message comprising the header field;
responsive to receiving the opt out message, drop all messages addressed to the user that comprise the thread ID; and
receiving, at the first entity, a reply email message from the second entity, wherein the reply email message comprises all content of the header field in the unmodified state.

11. The method of claim 10, wherein the electronic message-related functionality enabled by the persistent qualifier comprises enabling any entity capable of recognizing the persistent qualifier to identify the originating entity as the originator of the email message irrespective of a number of transmission hops experienced by the email message since its generation.

12. The method of claim 10, wherein the electronic message-related functionality enabled by the persistent qualifier comprises electronic message tracing.

13. The method of claim 10, wherein the electronic message-related functionality enabled by the persistent qualifier comprises electronic message tracking.

14. The method of claim 10, wherein the electronic message-related functionality enabled by the persistent qualifier comprises thread closure.

15. A method of electronic messaging, the method comprising:

generating, at a first entity, a persistent qualifier that indicates that a header field of an electronic message is to be preserved by entities receiving the electronic message, wherein the electronic message is a new electronic message (email) composed by the first entity, the first entity being an originating entity comprising a mail user agent (MUA);
adding, by the first entity, a unique identifier (ID) to the header field of the email message, wherein the unique ID is different than a Message-ID;
transmitting the email message along with the header field having the persistent qualifier and the unique ID to a second entity such that the second entity receiving the email message recognizes the persistent qualifier in the header field and then preserves all content of the header field having the persistent qualifier and the unique ID, wherein the persistent qualifier facilitates user opt out of an electronic message string or group; and
transmitting the email message from the second entity to a third entity, wherein the header field of the email message is transmitted in an unmodified state such that the persistent qualifier, the unique ID, and/or other contents of the header field reach the third entity from the first entity via the second entity unchanged to facilitate electronic message-related functionality,
wherein the electronic message-related functionality is enabled by the persistent header.

16. The method of claim 15, wherein the electronic message-related functionality comprises electronic message originator identification such that any recipient of the email message recognizing the persistent qualifier is capable of identifying the first entity as the origin of the email message based on the unique ID.

* * * * *